United States Patent [19]

Vikari et al.

[11] Patent Number: 5,238,663
[45] Date of Patent: Aug. 24, 1993

[54] NICKEL RECOVERY PROCESS

[75] Inventors: Werner Vikari, Darmstadt; Ralf Steinsträsser, Rossdorf; Heinrich Nikolaus, Dreieich; Günther Feldmann-Schlohbohm, Dieburg; Klaus Behne, Dreieich, all of Fed. Rep. of Germany

[73] Assignee: Merck Patent Gesellschaft mit Breschrankter Haftung, Darmstadt, Fed. Rep. of Germany

[21] Appl. No.: 758,070

[22] Filed: Sep. 12, 1991

[30] Foreign Application Priority Data

Sep. 13, 1990 [DE] Fed. Rep. of Germany ....... 4028989

[51] Int. Cl.$^5$ ............................................. C01G 53/00
[52] U.S. Cl. .................................. 423/139; 423/140; 75/738; 210/688; 210/705; 210/723; 210/692
[58] Field of Search ....................... 423/139, 140, 138; 75/738; 210/688, 705, 723, 727, 692

[56] References Cited

U.S. PATENT DOCUMENTS

| | | | |
|---|---|---|---|
| 3,591,010 | 7/1971 | Pall | 210/493 |
| 4,303,704 | 12/1981 | Courduvelis | 427/345 |
| 4,876,036 | 10/1989 | Canadau et al. | 252/637 |

FOREIGN PATENT DOCUMENTS

| | | |
|---|---|---|
| 55-005732 | 6/1980 | Japan . |
| 55-91985 | 7/1980 | Japan . |
| 55-91986 | 7/1980 | Japan . |

Primary Examiner—Theodore Morris
Assistant Examiner—Edward Squillante
Attorney, Agent, or Firm—Millen, White, Zelano & Branigan

[57] ABSTRACT

The invention relates to a process for recovering nickel from industrial effluents, characterized in that
  a) the effluent loaded with nickel is allowed to settle in a corrugated-plate separator (1) for the removal of solid constituents contained therein,
  b) a flocculant is added and the mixture is neutralized with alkali or mineral acid,
  c) after flocculation, the mixture is again allowed to settle in a corrugated-plate separator (3) and
  d) filtered through a sand filter (4),
  e) the filtered effluent is passed through a sequestering cation exchanger system containing three exchanger columns, the first column (5) being loaded up to breakthrough of nickel, the second column (6) serving as a guard filter and the third column (7) being regenerated or standing by in the freshly regenerated state,
  f) the particular column loaded with nickel is regenerated with dilute mineral acid, and
  g) the regenerate is treated with sodium hypophosphite in the presence of catalytic quantities of sodium borohydride, and to equipment for carrying out this process.

13 Claims, 2 Drawing Sheets

NICKEL RECOVERY PROCESS

SUMMARY OF THE INVENTION

The invention relates to a process for recovering nickel from industrial effluents.

In many industrial processes, for example in nickel-plating, olefin oligomerization and catalytic hydrogenation with Raney nickel, nickel is used in various forms (metallic, as a salt or bound in a complex) and then appears in the effluent, likewise in various forms.

The problem of recovering the nickel from nickel-loaded effluents can be solved in various ways.

For purifying the effluents from nickel-plating, ion exchanger processes are frequently used (for example JP 49 096,930), wherein other metals can be separated off beforehand as hydroxides by neutralization with alkali (for example JP 49 122,900) or other constituents are retained by filtration over activated carbon (for example JP 49 054,231).

The ion exchanger materials used are as a rule strongly acidic cation exchangers. The ion exchangers loaded with nickel are as a rule regenerated with dilute mineral acids, the recovered nickel being obtained in the form of nickel salts.

It is also known to recover nickel from effluents by electrodialysis on anion and cation exchanger membranes (for example JP 49 010,555).

A further possibility for the elimination of nickel from effluents is to precipitate nickel by electrolysis (for example Galvanotechnik, 73 (6), pages 589–593 (1982), U.S. Pat. No. 4,556,469).

A further possibility is to precipitate metallic nickel electrolytically from the nickel salt solutions obtained by means of ion exchangers (for example DD-204,950).

Nickel salts can also be precipitated from effluents by the addition of metal salts at controlled pH (for example JP 56 158,182, SU 1,031,911).

The hitherto known processes can, however, be applied only to effluents which contain nickel in a dissolved form.

In the catalytic hydrogenation with Raney nickel, the effluent contains nickel in dissolved, solid, colloidal and complex-bound form.

In the catalytic hydrogenation with Raney nickel, the effluent contains nickel in dissolved, solid, colloidal and complex-bound form.

One possibility for separating suspended heavy metal hydroxides from the corresponding dissolved ions in effluents is to pass these effluents over a three-layer filter system, the individual filters containing granules of different grain size (for example Japanese Laid-Open Application JP 55 005,732).

None of the methods hitherto known allows nickel to be removed down to a residual content of <1 mg/l from effluent loaded with nickel in a solid, ionic, colloidal and complex-bound form.

An object of the invention is to provide a process and equipment for removing the nickel from effluents loaded with nickel in diverse forms, and recovering it, to such an extent that the residual nickel content of the effluent thus treated is far below the statutorily prescribed standards (for example H. P. Luehr, A. Schönfeld, Entsorgungspraxis, (11) pages 506–512 (1988)).

Upon further study of the specification and appended claims, further objects and advantages of this invention will become apparent to those skilled in the art.

The advantages achieved by the invention are especially that the treated effluent has a residual nickel content which is far below the statutorily prescribed standard (for example Water Resources Act and Effluent Levy Act), and recovered nickel can be utilized again for industrial processes.

A subject of the invention is thus a process for recovering nickel from industrial effluents, wherein
a) the effluent loaded with nickel is allowed to settle in a corrugated-plate separator (1) for the removal of solid constituents contained therein,
b) a flocculant is added and the mixture is neutralized with alkali or mineral acid,
c) after flocculation, the mixture is again allowed to settle in a corrugated-plate separator (3) and
d) filtered through a sand filter (4),
e) the filtered effluent is passed through a sequestering cation exchanger system comprising three exchanger columns, the first column (5) being loaded up to breakthrough of nickel, the second column (6) serving as a guard filter and the third column (7) being regenerated or standing by in the freshly regenerated state,
f) the particular column loaded with nickel is regenerated with dilute mineral acid, and
g) the regenerate is treated with sodium hypophosphite in the presence of catalytic quantities of sodium borohydride.

A particular subject of the invention is a process wherein the settling step (a) is carried out at temperatures between 60° and 90°.

An advantageous embodiment of the invention is a process wherein in step (b) the pH is adjusted to 5–8.5.

A further subject of the invention is equipment for recovering metallic nickel from industrial effluents, comprising
a) a first corrugated-plate separate (1) for the removal of solid constituents,
b) a neutralization and flocculation vessel (2),
c) a second corrugated-plate separator (3) for separating off the constituents flocculated in (2),
d) two or more sand filters (4) connected in parallel,
e) three cation exchanger columns (5), (6) and (7) with sequestering cation exchanger, and
f) a reduction vessel (8).

The effluents are as a rule loaded with nickel in the following way:
a) General effluent:
10–100 mg/l of Ni (metallic)
10–50 mg/l, usually about 20 mg/l of Ni (ionic, colloidal and complex)
b) Regeneration waters from the ion exchangers:
5–40 mg/l, usually about 10 mg/l of Ni (ionic, colloidal and complex).

After the treatment by the process according to the invention, these effluents contain less than 1 mg/l of Ni.

DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

Figure 1:
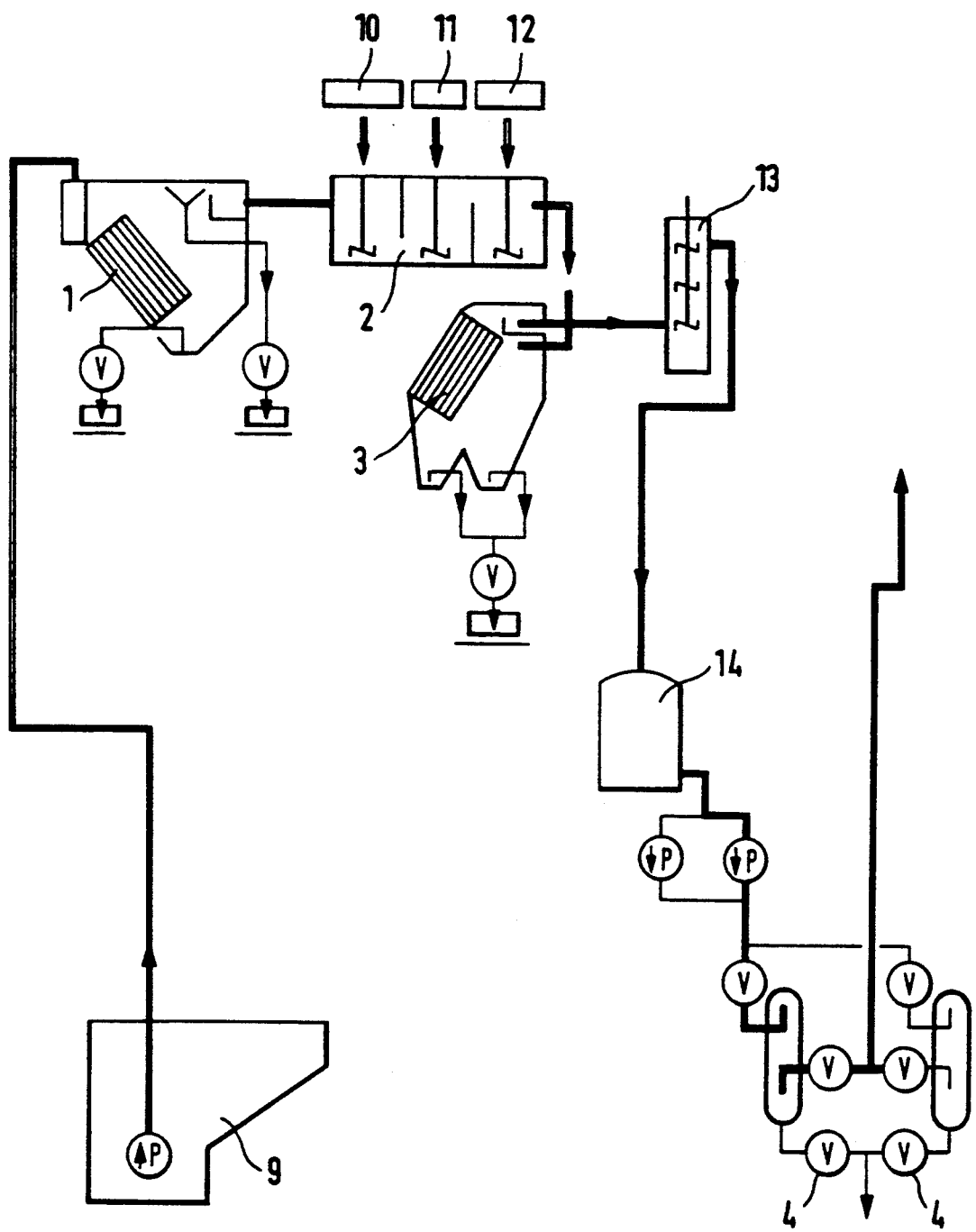
FIG. 1 shows a flow diagram for separating off solid constituents (Part 1 of the installation)

The explanation of the invention by reference to the drawings with respect to the structure and mode of operation of the invention now follows.

DETAILED DESCRIPTION

FIG. 1

The nickel-loaded effluent streams converge in the collecting shaft (9). This shaft has a capacity of about 15 m$^3$, of which about 3 m$^3$ serve as the working zone. Mixing is effected by blowing in compressed air.

By means of a submerged pump, which is switched on and off via the level in the collecting shaft (9), the water is pumped through a heat exchanger for heating to 60°–90° C. and then to the corrugated-plate separator (1) which is operated in counter-current and whose object it is to remove, on the one hand, entrained traces of gear oil and, on the other hand, the main quantity of metallic nickel from the water. In the downstream neutralization and flocculation vessel (2), the pH is corrected to a value between 5 and 8.5, especially between 6 and 8.5, by metered addition of alkali, preferably sodium hydroxide solution, (by means of a metering pump from stock tank (10)) or mineral acid, preferably hydrochloric acid (by means of a metering pump from stocks tank (11)), and the flocculation is initiated by addition of flocculant by means of a metering pump from the make-up tank (12).

Suitable flocculants are anionic copolymers of (meth)acrylamide with an increasing proportion of (meth)acrylate, especially Preastol ® 2540 (made by Stockhausen GmbH, Krefeld).

Figure 2:
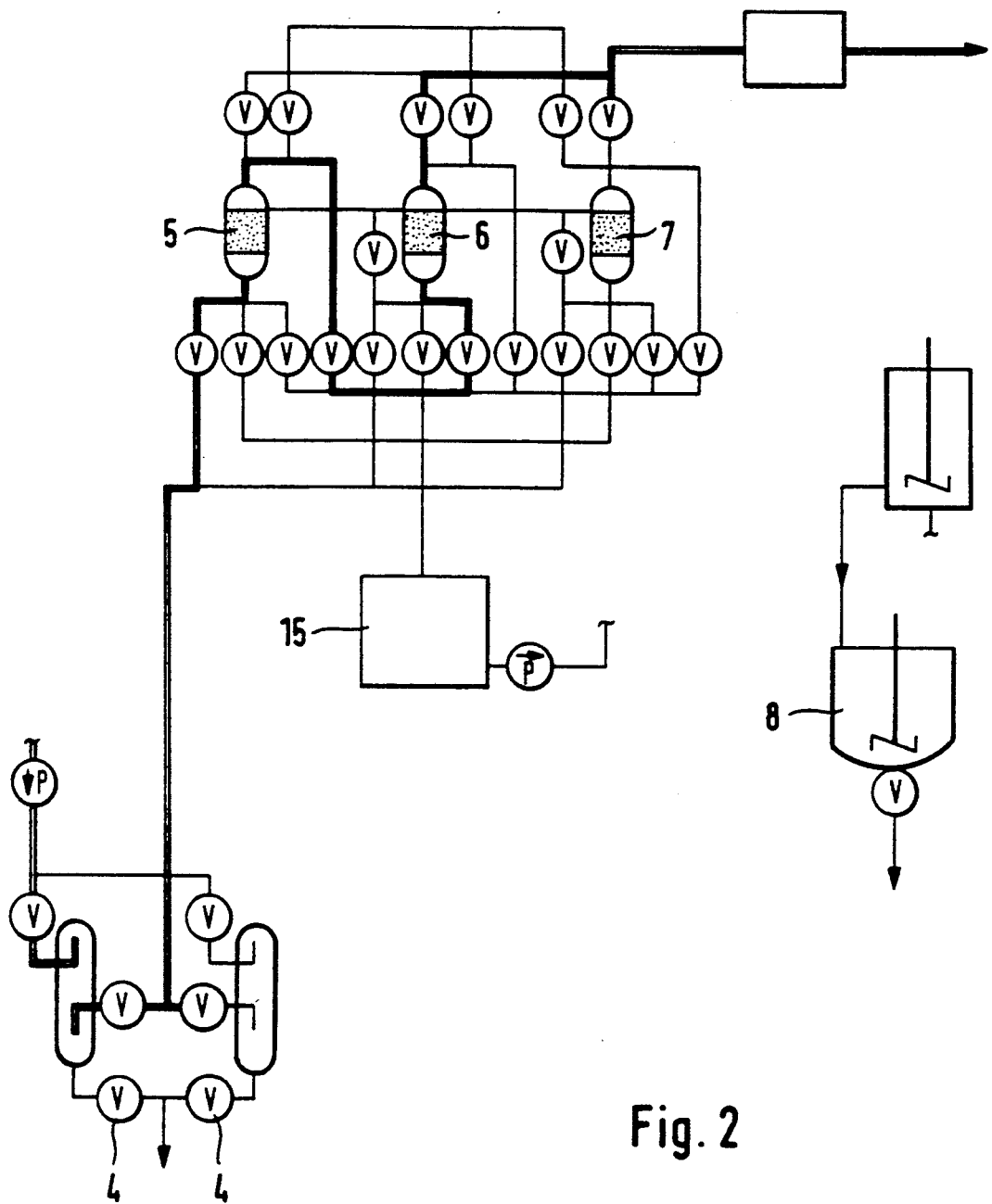
FIG. 2 shows a flow diagram for separating off dissolved constituents (Part 2 of the installation).

The precipitated solid constituents are separated off by the downstream corrugated-plate separator (3). After lowering the pH in the continuous-flow mixer (13), the water collects in the tank (14) which serves as feed tank for the two sand filters (4) to be used alternately. The effluent running out of the sand filter no longer contains any turbidity substances which can lead to a blockage of the chelate exchanger columns (5), (6) and (7), belonging to the second part (FIG. 2) of the installation.

FIG. 2

The effluent, which runs out from Part 1 of the effluent pretreatment installation (FIG. 1) out of the sand filters (4) and has been freed of solid nickel fractions (2.0 m$^3$/hour–5.0 m$^3$/hour, containing 10–50 mg of nickel/l in the dissolved form) runs through two series-connected columns (5) and (6) which are filled with the chelate exchanger resin and in which nickel is selectively retained. Examples of suitable chelate exchanger resins are weakly acidic to weakly alkaline polystyrene resins, which contain iminodiacetate groups as anchoring groups. The particle size is between 0.3 and 1.2 mm, with the effective particle size between 0.45 and 0.55 mm. A particularly preferred resin is Lewatit ® TP 207 (made by Bayer, Leverkusen) or Dow ® type XF-4195 (made by Dow Chemical).

The first column (5) is loaded up to breakthrough of nickel, whereas the second one serves as a guard filter. After exhaustion of the first column, the latter is taken out of the combination and replaced by a freshly regenerated column (7) which is arranged downstream of the column which is still in operation and partially loaded with nickel. The exchanger system thus consists of the three columns (5), (6) and (7), of which always two (5) and (6) are in operation, while the third one (7) is being regenerated or standing by in a freshly regenerated state.

The water with a residual content of <1 mg of nickel/l is then introduced via a rate counter and a rate-proportional sampling station into the sewer system and fed to the effluent treatment plant.

The regeneration of the exchanger columns (5), (6) and (7) loaded with nickel is carried out with dilute mineral acid, in particular hydrochloric acid. After the regeneration, the chelate resin can, if required, by conditioned by means of a pump with a solution of common salt in dilute sodium hydroxide solution.

The regenerate from the chelate exchangers, containing on average 10–30 g of nickel per liter in a hydrochloric acid solution, is collected in the enamelled steel tank (15). This solution can either be used again as raw material or be heated in the stirred vessel (8) to 50° C. and reduced to metallic nickel at pH 5 with 50% sodium hypophosphite solution in the presence of catalytic quantities of sodium borohydride. This nickel is separated off in the corrugated-plate separator (1) (Part 1 of the effluent pretreatment installation) together with the solid nickel fractions of the original effluent and passed to further processing.

The reduction of aqueous nickel salt solutions with sodium hypophosphite in the presence of catalytic quantities of sodium borohydride is known per se (for example company brochure of Morton Thiokol, N.V.-S.A. Ventron Division: M. Fleming "Reduction of Nickel(II) Complexes in Spent Electroless Plating Baths with VenPure ® Sodium Borohydride"). For the reduction of 1,000 l of regenerate, 20–50 kg of sodium hypophosphite and 0.15–0.6 kg of sodium borohydride are required, depending on the nickel content.

Corrugated-plate separators suitable for use in the inventive process are known such as those manufactured by the Wabag Company, an affiliate of Babcock. Suitable exchanger systems for use with the invention are also known. See, e.g., JP 50 066 494 and JP 53 109 894.

The entire disclosures of all applications, patents and publications, cited above and below, and of corresponding application Federal Republic of Germany P 40 28 989.3, filed Sep. 13, 1990, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for recovering nickel from an industrial effluent, comprising:
    a) subjecting an effluent loaded with nickel to settling in a corrugated-plate separator whereby solid constituents contained in said effluent are removed, said settling being conducted at a temperature of 60°–90° C.;
    b) after said settling in (a), adding a flocculant to said effluent and neutralizing said effluent with alkali or mineral acid;
    c) after flocculation, subjecting said effluent to settling in a corrugated-plate separator;

d) after said settling in (c), filtering said effluent in a sand filter;

e) passing filtered effluent through a sequestering cation exchanger system comprising three exchanger columns wherein a first column removes nickel from said filtered effluent, a second column serves as a guard filter, and a third column which is either being regenerated or is standing by in a regenerated state;

f) regenerating a column of said exchanger system loaded with nickel with dilute mineral acid, yielding a regenerate; and g) contacting said regenerate with sodium hypophosphite in the presence of catalytic quantities of sodium borohydride.

2. A process according to claim 1, wherein in (b) the pH is adjusted to 5–8.5.

3. A process according to claim 1, wherein treated effluent removed from said exchanger system contains less than 1 mg/l of Ni.

4. A process according to claim 1, wherein, prior to (a), said effluent contains 10–100 mg/l of Ni in metallic form and up to 20 mg/l of Ni in ionic, colloidal and complexed form.

5. A process according to claim 3, wherein in (b) the pH is adjusted to 6–8.5.

6. A process according to claim 1, wherein pH adjustment in (b) is provided by addition of sodium hydroxide or hydrochloric acid.

7. A process according to claim 1, wherein said flocculant is an anionic copolymer of (meth)acrylamide.

8. A process according to claim 1, wherein said columns of said exchanger system contain chelate exchanger resin having a particle size is 0.3–1.2 mm.

9. A process according to claim 1, wherein regeneration of said exchanger columns is performed using hydrochloric acid.

10. A process according to claim 1, wherein said industrial effluent treated in (a) contains solid, ionic, colloidal, and complexed nickel.

11. A process according to claim 1, wherein the effluent discharged from said cation exchanger system contains less than 1 mg of nickel/l.

12. A process according to claim 9, wherein said regenerate of (f) comprises a hydrochloric acid solution containing 10–30 g of nickel/l.

13. A process according to claim 1, wherein after treatment in (g), said regenerate containing metallic nickel is delivered to said corrugated-plate separator of (a) wherein solid nickel is removed from said regenerate.

* * * * *